July 30, 1968   R. C. BUELER   3,394,968
CONTROL VALVE
Filed Dec. 30, 1966
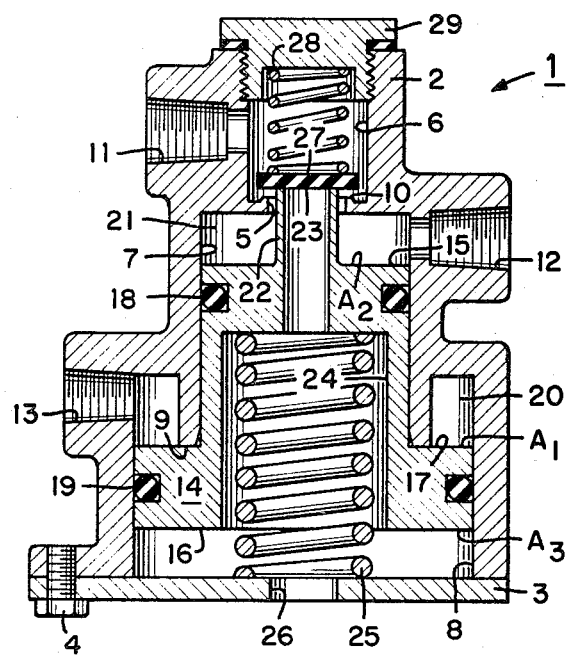
INVENTOR
RICHARD C. BUELER
BY
Joseph E. Papin.

United States Patent Office 3,394,968
Patented July 30, 1968

3,394,968
CONTROL VALVE
Richard C. Bueler, Glendale, Mo., assignor to W
Liquidating Corp., a corporation of Delaware
Filed Dec. 30, 1966, Ser. No. 606,219
13 Claims. (Cl. 303—68)

ABSTRACT OF THE DISCLOSURE

A control valve having resiliently urged means therein for normally effecting the application of fluid pressure supplied to said control valve therethrough to the emergency chamber of a spring set brake cylinder and being responsive to a control fluid pressure metered thereto for isolating the supplied fluid pressure and effecting a metered reduction of the applied fluid pressure.

---

This invention relates to control valves for spring set brake systems and in particular to those control valves for effecting emergency energization of said spring set brake systems.

In the past spring set brake systems for a vehicle or the like, an application valve was operable to selectively apply service fluid pressure from a source thereof to a spring set brake cylinder to actuate a fluid pressure responsive service member thereof which, in turn, energized a brake device operatively connected with said spring set brake cylinder. The spring set brake cylinder was also provided with an emergency or resiliently urged member responsive to emergency fluid pressure less than a predetermined value supplied thereto from another or an emergency fluid pressure source to drivingly actuate and mechanically effect emergency energization of the brake device. In order to manually actuate the emergency member, a push-pull valve of a type well known to the art was provided in the vehicle for operator actuation and manually movable between a charging position for supplying emergency fluid pressure to the resiliently urged member and another exhaust position for venting or dumping the fluid pressure supplied to said resiliently urged member to the atmosphere, thereby also mechanically effecting emergency energization of the brake device. One of the disadvantageous or undesirable features of such past spring set brake systems was the lack of control over the emergency energization of the brake device. In other words, the extent of intensity of the emergency energization of the brake device depended upon the extent of the depletion of the emergency fluid pressure below the predetermined value. For instance, if the emergency fluid pressure was depleted down to the predetermined value due to slow leaks or the like in the system, the emergency energization of the brake device was rather gradual and of rather light intensity on the order of brake drag conditions; however, if the emergency fluid pressure was completely depleted due to a conduit rupture or the like, the emergency energization of the brake device was immediate and very intense. In the event of the aforementioned gradual reduction of the emergency fluid pressure and the accompanying rather light emergency energization of the brake device, it was often the case that the operator was unaware of such drag condition or light emergency energization of said brake device and continued to operate his vehicle under the assumption that full tank pressure was available for normal service braking. Further, in the event of the aforementioned complete dissipation of the emergency fluid pressure along with the accompanying immediate and very intense emergency energization of the brake device, the operator's control over the vehicle was greatly impaired, and in some instances, such as when operating the vehicle on slippery or undesirable roadways, such immediate and very intense emergency energization of the brake device might obviate the operator's control over the vehicle. In addition to the above, another disadvantageous or undesirable feature of such past spring set brake systems was the lack of ability for the operator to effect a manually controlled or metered dissipation of the emergency fluid pressure to provide controlled emergency or mechanical energization of the brake device. In other words, operator actuation of the aforementioned push-pull valve dumped the fluid pressure supplied to the resiliently urged member to atmosphere, thereby effecting an immediate and very intense mechanical energization of the brake device. Of course, such immediate and intense energization of the brake device also greatly affected the control of the operator over the vehicle and in some instances, such as on slippery or undesirable road conditions, might also completely obviate the operator's control over the vehicle. And yet another disadvantageous or undesirable feature of such past fluid pressure systems was that the push-pull valve was necessarily located in the vehicle adjacent to the driver; therefore, the fluid pressure exhausted from the resiliently urged member to effect emergency energization of the brake device necessarily travelled from the spring set brake cylinder located adjacent to the brake back to the push-pull valve located near the operator, and this flow of the exhausted fluid pressure effected an unnecessary time delay in brake device energization under emergency conditions.

The principal object of the present invention is to provide a novel control valve for use in a spring set brake system which obviates the aforementioned undesirable and disadvantageous features, and this and other objects and advantageous features for the present invention will become apparent hereinafter.

Briefly, the invention embodies a control valve having resiliently urged means therein for normally effecting the application of fluid pressure supplied to said control valve therethrough, said resiliently urged means also being responsive to a control fluid pressure selectively metered thereto to isolate the supplied fluid pressure from the applied fluid pressure and effect a metered reduction of the applied fluid pressure.

In the drawing wherein like numerals refer to like parts wherever they occur, a sectional view is shown illustrating a control valve embodying the present invention in cross-section.

Referring now to the drawing in detail, a control or inversion valve 1 is provided with a housing 2 having a closure member or retainer plate 3 connected with the lower end thereof by suitable means, such as a plurality of studs 4. The housing 2 is provided with an axial bore 5 which is interposed between an upper counterbore 6, which defines an inlet chamber, and lower stepped counterbores 7, 8 defining an annular shoulder 9 therebetween, and a valve seat 10 is defined on said housing at the juncture of the bore 5 and counterbore 6 in circumscribing relation with said bore 5. An inlet port 11, which is adapted to receive fluid pressure supplied thereto from a source (not shown), is provided in the housing 2 intersecting with the counterbore 6 adjacent to the lower end thereof, and an outlet port 12, which is adapted for connection with the emergency chamber of a spring set brake cylinder (not shown), such as that disclosed in United States Patent No. 3,152,521 issued Oct. 31, 1964 to Oliver B. Cruse, is also provided in said housing intersecting with the counterbore 7 adjacent to the upper end thereof. A control port 13, which is adapted for selective subjection to the atmosphere and to metered fluid pressure, is provided in the housing 2 intersecting with the counterbore 8 adjacent to the housing shoulder 9.

A stepped application or piston member 14 is provided with upper and lower opposed ends 15, 16 having an annular abutment shoulder 17 interposed therebetween, said piston being slidably received in the stepped counterbores 7, 8 and having peripheral seals 18, 19 provided thereon for sealing engagement with said stepped counterbores, respectively. An expansible fluid pressure control chamber 20 is defined in the counterbore 8 between the housing shoulder 9 and the piston shoulder 17 in open pressure fluid communication with the control port 13 at all times, and it should be noted that said piston shoulder defines an effective area $A_1$ which is substantially equal to the difference between the effective cross-sectional areas $A_2$, $A_3$ of the piston upper and lower ends 15, 16 taken, for instance, across the seals 18, 19, said recess areas $A_1$ and $A_2$ being additive. An outlet chamber 21 is defined in the counterbore 7 between the piston upper end 15 and the upper end wall of said counterbore in open pressure fluid communication with the outlet port 12. The piston 14 is provided with a stem or extension 22 integrally formed on the upper end 15 thereof and having a free end portion defining a valve seat 23 movable through the housing bore 5, and a stepped exhaust passage 24 is coaxially provided through said piston, extension and valve seat. A pre-compressed spring 25 is biased between the piston 14 and the closure member 21 normally urging said piston upwardly toward its operative position engaging the piston shoulder 14 with the housing shoulder 9. It should be noted that the pre-compressive force of the spring 25 is substantially equal to or slightly in excess of the force of the maximum desired applied fluid pressure at the outlet port 11 acting on the effective piston area $A_2$ and that the piston area $A_3$ is subjected to the atmosphere at all times through an exhaust port 26 provided in the closure member 3 in communication with the piston exhaust passage 24. In the operating position of the piston 13, as shown, the extension valve seat 23 is engaged with a valve element 27 closing the exhaust passage 24 and urging said valve element against its return spring 28 toward a position disengaged from the housing valve seat 10 to establish open pressure fluid communication between the inlet and outlet ports 11, 12. To complete the description of the control valve 1, another closure member 29 is threadedly received in the upper end of the counterbore 6 in seating engagement with the valve element return spring 28.

In the operation with the component parts of the control valve 1 positioned as above described, the supplied fluid pressure at the inlet port 11 is applied or flows through the inlet chamber 6, the housing bore 5 and the outlet chamber 21 to the outlet port 12, and as previously mentioned, the maximum desired applied or output fluid pressure at said outlet port acts on the area $A_2$ of the piston 14 to establish an output force $Fo$ which is substantially equal to and opposite to the pre-compressed force of the spring 25.

In the event it is desirable to effect a metered reduction of the applied fluid pressure at the outlet port 12, control fluid pressure selectively metered to the control port and chamber 13, 20 acts on the control area $A_1$ to establish a control force $Fc$ which is additive to the output force $Fo$ and also in opposition to the pre-compressed force of the spring 25. Since the pre-compressed force of the spring 25 and the output force $Fo$ are opposed and normally substantially balanced, the control force $Fc$ is effective to move the piston 14 downwardly against the spring 25 to sealably engage the valve element 27 with the housing valve seat 10 interrupting pressure fluid communication between the inlet and outlet ports 11, 12 and isolating the supplied fluid pressure at said inlet port. Further downward movement of the piston 14 in response to the additive forces $Fo$ and $Fc$ disengages the piston valve seat 23 from the valve element 27 to establish pressure fluid communication between the outlet and exhaust ports 12, 26 and meter the applied fluid pressure from said outlet port through the outlet chamber 21, the piston exhaust passage 24 and the exhaust port 26 to the atmosphere. Of course, the metered reduction of the applied fluid pressure at the outlet port 12 effects a corresponding reduction of the output force $Fo$; therefore, when the magnitude of the reduced output force $Fa$ and that of the additive control force $Fc$ become substantially equal to the pre-compressed force of the spring 25, the piston 14 is moved upwardly toward a lapped position wherein the piston valve seat 23 is re-engaged with the valve element 27, said valve element now being in lapped engagement with the housing and piston valve seats 10, 23. From the foregoing, it is, of course, apparent that the metered reduction of the magnitude of the applied fluid pressure at the outlet port 12 is substantially directly proportional to the magnitude of the metered fluid pressure at the control port 13. In the event a more intense metered reduction of the applied fluid pressure at the outlet port 12 is desired, the intensity of the metered control fluid pressure at the control port 13 is increased thereby increasing control $Fc$, and the piston 14 reacts to the increased control force $Fc$ to further effect metered dissipation of the applied fluid pressure at the outlet port 12, as previously described.

When it is desirable to re-establish the magnitude of the applied fluid pressure at the outlet port 12, the metered fluid pressure at the control port 13 is exhausted thereby eliminating the control force $Fc$. Upon the elimination of the control force $Fc$, the magnitude of the pre-compressed force of the spring 25 overcomes that of the reduced output force $Fo$; therefore, this differential between the pre-compressed force of said spring and the output force $Fo$ is effective to move the piston 14 upwardly toward its operative position to again disengage the valve element 27 from the housing valve seat 10 and re-establish open pressure fluid communication between the inlet and outlet ports 11, 12. In this manner, the applied fluid pressure at the outlet port 12 again becomes substantially equal to the supplied fluid pressure at the inlet port 11, and the magnitude of the output force $Fo$ is re-established to once again substantially balance the pre-compressed force of the spring 25.

The embodiments of the invention in which an exclusive property or privilege is claimed are defined as follows:

1. A control valve comprising a housing having inlet, outlet and control ports therein, valve means controlling pressure fluid communication between said inlet and outlet ports, valve control means movable in said housing, resilient means normally urging said valve control means into engagement with said valve means to urge said valve means toward a position establishing pressure fluid communication between said inlet and outlet ports, a pair of additive effective areas on said valve control means for subjection to the established fluid pressure at said outlet port and for selective subjection to metered fluid pressure at said control port, respectively, said valve control means being initially movable against said resilient means in response to the established fluid pressure at said outlet port acting on one of said areas and the metered fluid pressure at said control port acting on the other of said areas to move said valve means toward another position interrupting pressure fluid communication between said inlet and outlet ports and said valve control means being thereafter further movable to disengage said valve means and meter the established fluid pressure at said outlet port to the atmosphere when said control port is subjected to metered fluid pressure, a bore in said housing axially connected between a counterbore and a pair of stepped counterbores, said inlet and outlet ports being connected with said counterbore and the smaller of said stepped counterbores, respectively, a valve seat on said housing in circumscribing relation with said bore, an annular shoulder on said housing between said smaller and larger stepped counterbores, said valve control means including a stepped piston slidable in said larger and smaller counterbores, another annular shoulder on said stepped piston, a valve stem on said stepped piston and movable through said housing bore, a third annular shoulder on said stepped piston means at the juncture thereof with said valve stem and defining said one area, an exhaust valve seat defined on the free end of said valve stem for sealing engagement with said valve means, and exhaust passage means in said stepped piston extending through said valve seat, said resilient means normally urging said stepped piston shoulder into engagement with said housing shoulder and urging said exhaust valve seat into engagement with said valve means wherein said valve means is in its first named position disengaged from said first named valve seat, an expansible fluid pressure control chamber defined in said housing between said stepped piston and the side wall of said larger stepped counterbore and between said stepped piston shoulder and housing shoulder, said control port being connected in open pressure fluid communication with said control chamber at all times and said stepped piston shoulder defining said other area, said resilient means including a pre-compressed metering spring contained between said housing and said stepped piston wherein the established fluid pressure at said outlet port acting on said one area creates a force opposing and substantially equal to the pre-compressed force of said metering spring when said valve means is in its first named position, the metered fluid pressure at said control port acting on said other area to create another force additive to said first named force for moving said stepped piston means against said metering spring to initially engage said valve means with said first named valve seat interrupting pressure fluid communication between said inlet and outlet ports and thereafter disengage said exhaust valve seat from said valve means to open said exhaust passage means and effect the metered reduction of the established fluid pressure at said outlet port.

2. A control valve comprising a housing, a pair of spaced abutment means in said housing, application means movable between said abutment means in said housing for controlling the application through said housing of fluid pressure supplied thereto, pre-compressed resilient metering means between one of said abutment means and said application means normally urging said application means toward a position in said housing effecting the application therethrough of the supplied fluid pressure and into engagement with the other of said abutment means wherein the pre-compressed force of said resilient metering means is normally contained between said one and other abutment means, a metering area on said application means subjected to the applied fluid pressure, said metering area having a magnitude great enough when subjected to the applied fluid pressure to establish a metering force opposed to and substantially equal to the pre-compressed force of said resilient metering means when said application means is engaged with said other abutment means, said application means defining with said housing an expansible control chamber for selective subjection to the atmosphere and metered control fluid pressure, a control area on said application means in said control chamber and additive to said metering area, said control area being responsive to control fluid pressure when the control fluid pressure is selectively metered into said control chamber to establish a control force additive to the metering force to overcome the pre-compressed force of said resilient metering means and move said application means against said resilient metering means toward a metering position disengaged from said other abutment means isolating the supplied fluid pressure from the applied fluid pressure and metering the applied fluid pressure to the atmosphere to effect a metered reduction in the magnitude thereof and the magnitude of the metering force, said resilient metering means thereafter urging said application means toward said other abutment means and a lapped position in said housing isolating the applied fluid pressure from both the supplied fluid pressure and the atmosphere when the magnitudes of the additive control force and the reduced metering force attain a reduced value substantially equal to the force of said resilient metering means.

3. The control valve according to claim 2, comprising another area on said application means subjected at all times to the atmosphere, said other area being opposed to and substantially equal to said additive control and metering areas.

4. The control valve according to claim 2, wherein said resilient metering means comprises a metering spring having opposed end portions contained in pre-compressed engagement between said other abutment means and said application means and normally urging said application means into engagement with said one abutment means.

5. The control valve according to claim 2, wherein said application means defines with said housing a flow passage through which the supplied fluid pressure is applied, a valve seat on said housing about said flow passage, other means on said application means normally extending through said valve seats, passage means extending through said application means and other means for communicating the applied fluid pressure to the atmosphere, another valve seat on said other means about said passage means, and valve means normally engaged with said other valve seat closing said passage means and normally spaced from said first named valve seat, said valve means being movable with said application means upon actuation thereof to its metering position into engagement with said first named valve seat closing said flow passage and isolating the supplied and applied fluid pressure and said other means being thereafter further movable relative to said valve means to disengage said other valve seat therefrom opening said passage means to effect the metered reduction of the applied fluid pressure therethrough to the atmosphere, said other valve seat also being thereafter further movable relative to said valve means into lapped engagement therewith closing said passage means and isolating the applied fluid pressure from the atmosphere upon actuation of said application means from its metering position to its lapped position.

6. The control valve according to claim 5, wherein said application means includes a stepped piston slidable in said housing having a small end portion, a large end portion opposed to said small end portion, and an intermediate portion between said small and large end portions, said small end portion defining with said housing said flow passage and including said metering area, said other means being connected with said small end portion, said intermediate portion defining with said housing said control chamber and including said control area, said intermediate portion and large end portion being movable between said abutment means and said intermediate portion being normally urged into engagement with said other abutment means, and another area on said large end portion subjected at all times to the atmosphere, said other area being opposed to and substantially equal to the additive control and metering areas, and said passage means having one end extending through said other valve seat and the other end thereof connecting with said large end portion.

7. The control valve according to claim 2, wherein said application means includes a stepped piston slidable in said housing, the smaller portion of said stepped piston defining with said housing said flow passage and including said metering area, said other means being connected with said smaller portion, the larger portion of said stepped piston defining with said housing said chamber and including said control area, the larger portion of said stepped piston also being movable between said abutment means and normally urged into engagement with said one abutment means, and said passage means extending through said other means and the smaller and larger portions of said stepped piston.

8. A control valve comprising a housing having inlet, outlet and exhaust ports therein, valve means movable in said housing for controlling pressure fluid communication between said ports, a pair of spaced abutments in said housing, valve control means for operative engagement with said valve means and movable in said housing between said abutment means, a precompressed metering spring between one of said abutment means and said valve control means normally urging said valve control means into engagement with the other of said abutment means and into engagement with said valve means urging said valve means toward a normal position in said housing establishing pressure fluid communication between said inlet and outlet ports and interrupting pressure fluid communication between said outlet and exhaust ports, the pre-compressed force of said metering spring being normally contained between said abutment means when said valve control means is urged into engagement with said other abutment means, a metering area on said valve control means responsive to the established fluid pressure at said outlet port to establish a metering force opposed and substantially equal to the pre-compressed force of said metering spring when said valve control means is engaged with said other abutment means, a control port in said housing for selective subjection to metered fluid pressure, a control area on said valve control means responsive to metered fluid pressure at said control port upon the selective establishment thereof to establish a control force additive to the metering force and having additive magnitudes in excess of that of the pre-compressed force of said metering spring to concertedly move said valve means and valve control means against said metering spring toward a position in said housing wherein said valve means interrupts pressure fluid communication between said inlet and outlet ports and said valve control means being thereafter further movable relative to said valve means toward a metering position disengaged from said valve means to establish metered pressure fluid communication between said outlet and exhaust ports effecting a metered reduction of the established fluid pressure at said outlet port and the metering force, and said valve control means also being thereafter urged by said metering spring into lapped engagement with said valve means wherein said valve means interrupts pressure fluid communication between said outlet port and both said inlet and exhaust ports when the additive magnitudes of the control and reduced metering forces attain a reduced value substantially equal to the force of said resilient means.

9. The control valve according to claim 8, comprising a valve seat on said valve control means between said outlet and exhaust ports, said valve seat being normally engaged with said valve means interrupting pressure fluid communication between said outlet and exhaust ports when said valve control means is engaged with said other abutment means, another valve seat on said housing between said inlet and outlet ports, said valve means being normally urged by said valve control means from engagement with said other valve seat establishing pressure fluid communication between said inlet and outlet ports when said valve control means is engaged with said other abutment means, said valve means being movable with said valve control means upon actuation thereof toward its metering position into engagement with said other valve seat interrupting pressure fluid communication between said inlet and outlet ports and said valve control means being thereafter movable relative to said said valve means to disengage said first named valve seat therefrom establishing the metered pressure fluid communication between said outlet and exhaust ports, and said first named valve seat also being thereafter movable into lapped engagement with said valve means upon actuation of said valve control means toward its lapped position.

10. The control valve according to claim 9, wherein said valve means includes extension means having a free end portion thereon movable through said other valve seat for engagement with said valve means, said first named valve seat being defined on said free end portion, and passage means in said valve control means and extension means extending through said first named valve seat for venting the established fluid pressure at said outlet port to the exhaust port.

11. The control valve according to claim 10, wherein said valve control means comprises a stepped piston slidable in said housing having a small end portion, a large end portion opposed to said small end portion, and an intermediate portion between said small and large end portions, said extension means being connected with said small end portion and said metering area being defined on said small end portion, said control area being defined on said intermediate portion, said intermediate portion and large end portion being slidable in said housing between said abutment means and said intermediate portion being normally urged into engagement with said other abutment means, and another area on said large end portion opposed and substantially equal to the additive control and metering areas and subjected to the atmosphere at said exhaust port at all times, said passage means being connected between the free end portion of said extension means and said large end portion.

12. The control valve according to claim 8, wherein said said valve control means includes a stepped piston slidable in said housing, the smaller portion of said stepped piston defining said metering area, the larger portion of said stepped piston including said control area, and another portion normally urged into engagement with said abutment means, and an atmospheric area on the larger portion of said stepped piston opposed and substantially equal to the additive control and metering areas, said atmospheric area being subjected to the atmosphere at said exhaust port at all times.

13. A control valve comprising a housing, an inlet chamber defined in said housing, a stepped piston movable in said housing having opposed small and large end portions defining an annular shoulder therebetween, said small end portion defining with said housing an outlet chamber, a connecting passage in said housing between said inlet and outlet chambers, a valve seat on said housing about said connecting passage in said inlet chamber, a pair of abutment means on said housing, said large end portion being movable between said abutment means, a metering spring having opposed ends contained in precompressed engagement between one of said abutment means and said piston normally urging said shoulder into engagement with the other of said abutment means wherein said pre-compressed force of said metering spring is normally contained between said abutment means, extension means on said small end portion extending through said connecting passage into said inlet chamber when said shoulder is engaged with said other abutment means and defining another valve seat, an exhaust passage in said piston having one end extending through said other valve seat and the other end thereof intersecting with said large end portion for subjection to the atmosphere at all times, valve means in said inlet chamber normally urged into engagement with said other valve closing said exhaust passage, said extension means normally maintaining said valve means disengaged from said first valve means to establish pressure fluid communication between said inlet and outlet chambers through said connecting passage when said shoulder is engaged with said other abutment means, a metering area on said small end portion in said outlet chamber and responsive to the established fluid pressure therein to establish a metering force opposed and substantially equal to the pre-compressed force of said metering spring when said shoulder is engaged with said other abutment means, said piston and shoulder defining with said housing an expansible control chamber for selective subjection to metered control fluid pressure and separate from said inlet and outlet chambers, a control area defined on said shoulder in said control chamber and additive to said metering area, asid control area being responsive to control fluid pressure selectively metered into said control chamber to establish a control force additive to said metering force to overcome the precompressed force of said metering spring and initially move said piston thereagainst toward a position wherein said valve means is urged into engagement with said first named valve seat closing said connecting passage and interrupting pressure fluid communication between said inlet and outlet chambers, said piston being thereafter further movable in response to the additive control and metering forces relative to said valve means toward a metering position disengaging said other valve seat from said valve means to open said exhaust passage and effect a metered reduction of the established fluid pressure in said outlet chamber and also reduce the metering force, and said piston also being subsequently movable from its metering position to a lapped position in said housing to re-engage said other valve seat with said valve means closing said exhaust passage wherein said outlet chamber is isolted from both the atmosphere and the inlet chamber when the additive magnitudes of the control force and the reduced metering force attain a reduced value substantially equal to the force of said metering spring.

References Cited
UNITED STATES PATENTS 3,273,950   9/1966   Vielmo _____ 303—6 XR

FOREIGN PATENTS 631,218   11/1961   Canada.

MILTON BUCHLER, *Primary Examiner.*

J. J. McLAUGHLIN, *Assistant Examiner.*